Figure 1:
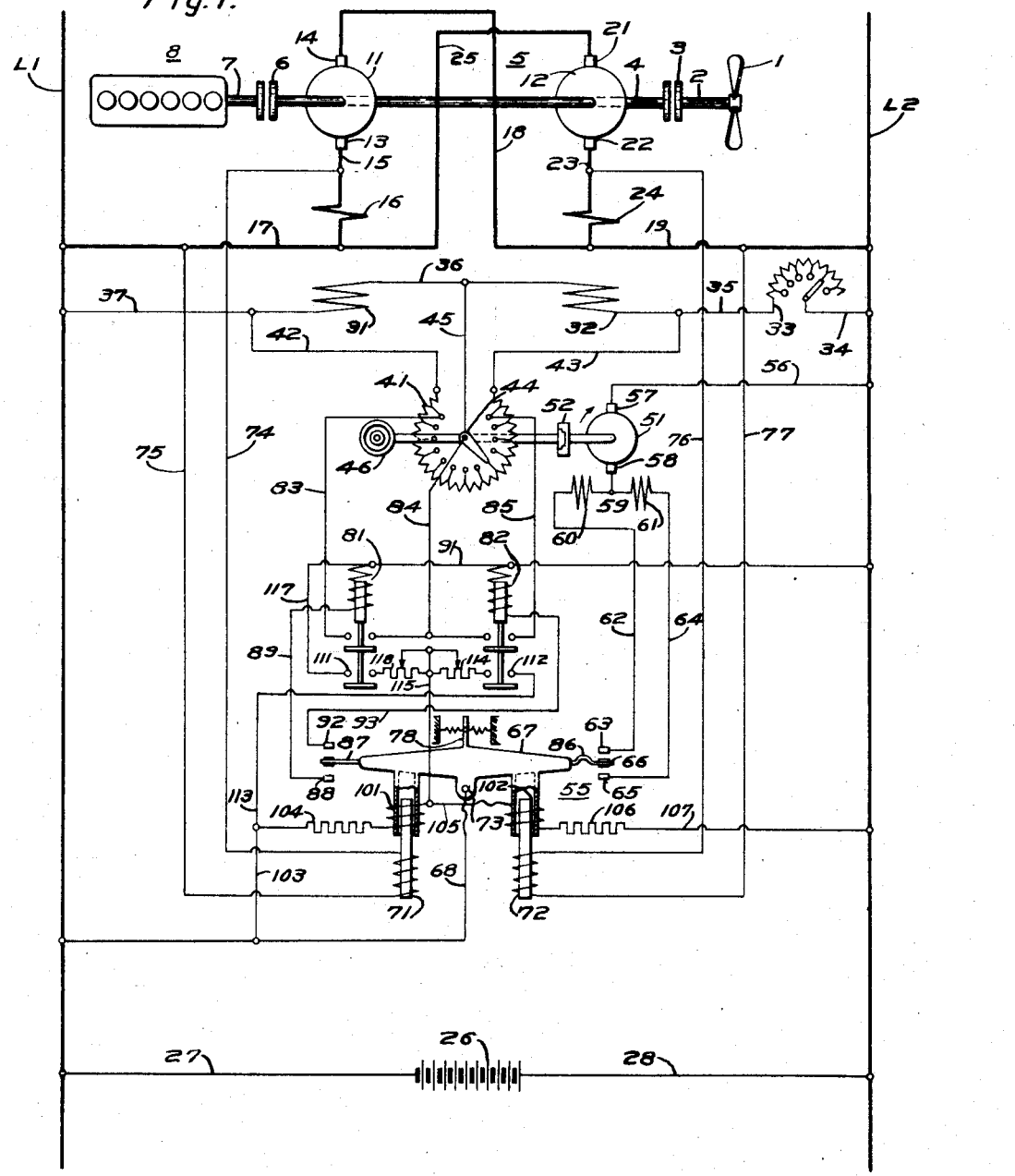

Aug. 23, 1932.  W. SCHAELCHLIN  1,873,046
LOAD BALANCING EQUIPMENT
Filed May 28, 1930  2 Sheets-Sheet 1

INVENTOR
Walter Schaelchlin.
BY
ATTORNEY

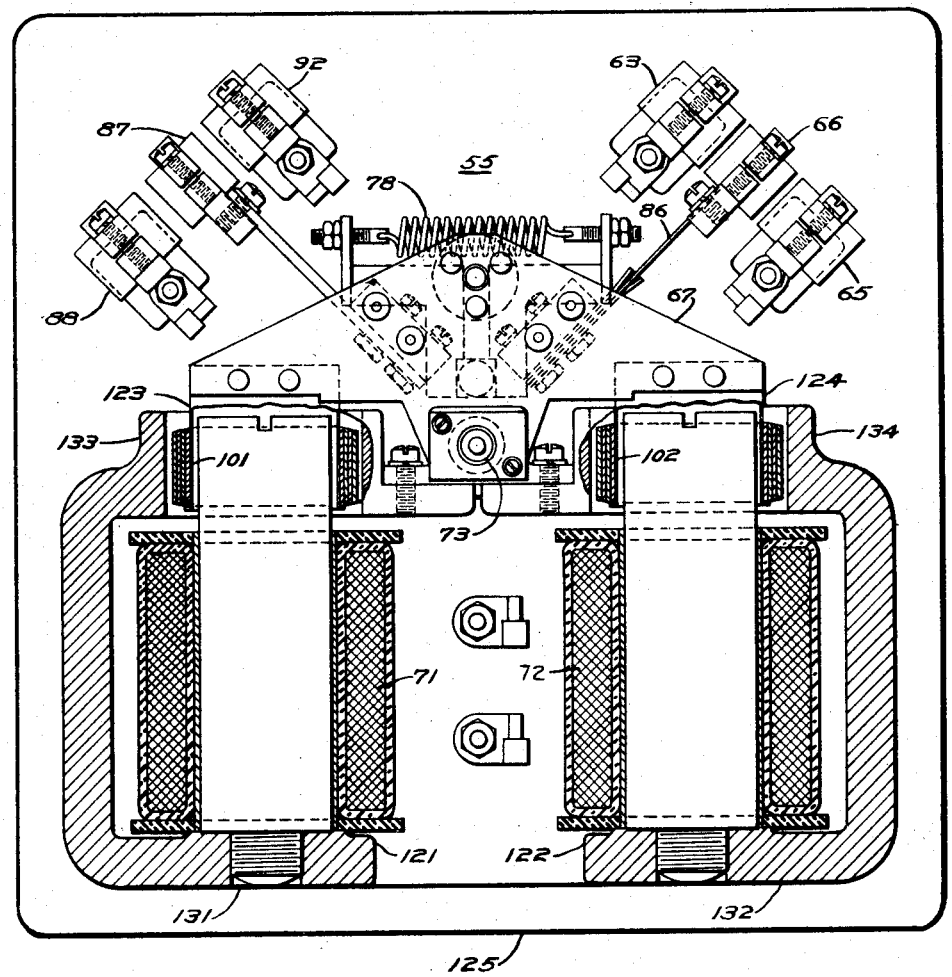

Patented Aug. 23, 1932

1,873,046

UNITED STATES PATENT OFFICE

WALTER SCHAELCHLIN, OF WILKINSBURG, PENNSYLVANIA, ASSIGNOR TO WESTINGHOUSE ELECTRIC & MANUFACTURING COMPANY, A CORPORATION OF PENNSYLVANIA

LOAD BALANCING EQUIPMENT

Application filed May 28, 1930. Serial No. 456,330.

My invention relates in general, to load-balancing systems and in particular to systems for balancing the armature currents of a plurality of direct-current dynamo-electric machines.

When two or more separately excited direct-current dynamo-electric machines are connected electrically, with their armature windings in parallel-circuit relation and with their rotating elements connected mechanically, it is difficult to maintain the currents flowing in the various armature windings at predetermined relative values. The reason for this is that direct-current machines have what is known as flat speed-load characteristics, or, in other words, the relation between the armature currents flowing in the machines, and their speeds of rotation is such that in a given machine, a small variation in speed may cause a relatively large variation in the amount of current flowing in the armature circuit.

When two or more armatures are connected mechanically to run at predetermined relative speeds, a slight discrepency in the speed-load characteristics of the various armatures may result in a large difference in the amount of load taken by the several machines at the particular speed at which they may be operated. The amount of discrepency in the characteristics of the armatures, which will result in an undesirable unbalanced condition, is so small that it may arise from unavoidable variations in the construction of the machines or even from differences in the temperatures of the machines. Consequently, it is practically impossible to construct and operate a plurality of mechanically-connected direct-current machines in parallel-circuit relation in such manner that each armature will carry its share of the load unless additional devices are provided for adjusting the machines to correct for discrepencies in their characteristics.

Heretofore, it has been the practice to effect the proper distribution of loads between a plurality of mechanically-connected armatures by means of motor-operated rheostats which were disposed to operate in response to the currents flowing in the armature circuits and to regulate the currents flowing in the field circuits. However, the motor-driven field rheostats must necessarily operate at slow speeds in order to effect fine adjustments and, consequently, an unbalanced condition of considerable magnitude may exist for some time before it is corrected by the motor-operated rheostats, with the result that the armature carrying the heavy current may be damaged.

It is an object of my invention to provide a control system for a plurality of dynamo-electric machines which will automatically and continuously regulate the currents flowing in the machine in such manner as to substantially maintain a predetermined ratio between the armature currents of the several machines.

Another object of my invention is to provide means for automatically balancing the currents flowing in a plurality of direct-current dynamo-electric machines connected electrically in parallel relation and connected mechanically to rotate together, in such manner that a predetermined ratio between the armature currents will be substantially maintained.

A more specific object of my invention is to provide a device for balancing the currents flowing in the armatures of a plurality of mechanically connected direct-current machines, which will operate in such manner that an instantaneous correction of an undesirable unbalanced condition will be effected during the period in which a permanent adjustment of the field current is being made.

A further object of my invention is to provide a load-balancing system for direct-current machines which will operate to automatically effect rapid and permanent balancing of the armature currents, irrespective of the direction in which the currents are flowing through the machines or of the direction of rotation thereof.

In the present invention, the foregoing objects have been attained by providing a motor-operated rheostat for effecting a permanent adjustment of the field circuits, which operates in conjunction with a relay, and with suitable contactors for intermittently shunting portions of the rheostat resistance element to effect instantaneous load balancing.

These objects, and others which will be brought out in the following specification may be atained by means of the apparatus described therein and shown in the accompanying drawings in which;

Fig. 1 is a schematic diagram of an electrical control system embodying my invention and of dynamo-electric machines which are regulated in accordance with the invention, and, Fig. 2 is a view, partly in section and partly in side elevation, of a relay which constitutes an important element of my control system.

The particular dynamo-electric machines which are shown diagrammatically in Fig. 1 constitute a portion of the propelling equipment of a submarine boat of the twin-screw type.

In submarine vessels of the twin-screw type, the electric propulsion motors are placed at the sides of the boat near the stern. Inasmuch as the space available in the after part of the boat is restricted, it has been found desirable to construct the propulsion motors with two independent armatures so that each motor may be made relatively long and of small diameter. In this manner, the available space may be utilized advantageously.

The schematic diagram at the top of Fig. 1 represents one of the propulsion units of a twin-screw propeller 1 of suitable construction which is mounted at the end of a propeller shaft 2 that extends through the hull (not shown) of the submarine. The propeller shaft 2 may be connected, by means of a clutch 3, to an armature shaft 4 of direct-current dynamo-electric machines that constitutes the propulsion motor 5. Likewise, the armature shaft 4 may be connected, by means of a second clutch 6, to the crank shaft 7 of a Diesel engine 8 or other suitable prime mover. When the submarine is operated on the surface, in the normal manner, power is transmitted from the engine 8, through the clutch 6, the armature shaft 4 and the clutch 3, to the propeller shaft 2, and the propeller 1. When operating in this manner, the propulsion motor 5 is isolated electrically from the remainder of the electrical system and functions simply to transmit mechanical power from the engine 8 to the propeller 1. If it is desired to drive the propeller 1 electrically by means of the motor 5, the clutch 6 may be disengaged to disconnect the engine 8 from the shaft 4, and the motor 5 may be connected electrically to the ship's electrical system in such manner that it will operate as a propulsion motor. In case it is desired to utilize the machine 5 as a generator, the clutch 3 may be disengaged and the clutch 6 engaged to connect the armature shaft 4 to the crank shaft 7 of the engine 8.

As shown in the drawings, the propulsion motor 5, comprises two separate armatures 11 and 12 which are both rigidly mounted on the armature shaft 4, and constitute parts of two electrically independent dynamo-electric machines. The armatures 11 and 12 of the two propulsion motors in a submarine may be connected, by suitable switching equipment (not shown), in series, series-parallel or parallel-circuit relation. Normally, all of the armatures are connected in parallel relation, as are the armatures 11 and 12, as shown in Fig. 1.

Referring to the wiring diagram, the armature 11 is provided with brushes 13 and 14, in the usual manner. The brush 13 is connected, by means of a conductor 15, to an interpole field 16 which is in series with the armature 11 and is connected, by means of a conductor 17, to a line conductor L1. The other brush 14 of the armature 11 is connected, by means of a conductor 18, to a conductor 19 and thence to another line conductor L2.

The armature 12 is likewise provided with brushes 21 and 22. The brush 22 is connected, by a conductor 23, to a series interpole winding 24 which is connected to the conductor 19 and thence to the line conductor L2. The other brush 21 is connected, by means of a conductor 25, to the conductor 17 and thence to the other line conductor L1.

The line conductors L1 and L2, together with the parallel circuits through the armatures, 11 and 12 constitute the main electrical circuit of the submarine which is connected to a storage battery 26 by means of a conductor 27 leading from one terminal of the battery to the line conductor L1 and a conductor 28 from the other terminal of the battery to the line conductor L2. The battery 26 may be utilized as a source of electrical power for operating the dynamo-electric machines 11 and 12 as motors to constitute the propulsion motor 5 or the battery 26 may be charged by driving the dynamo-electric machines 11 and 12 as generators, by means of the engine 8.

The dynamo-electric machines 11 and 12 are provided with separately excited field windings 31 and 32, respectively, which are connected, in series-circuit relation, across the line conductors L1 and L2. In order that the amount of current flowing in the field windings 31 and 32 may be conveniently adjusted, the field circuit is provided with a variable-resistance element or rheostat 33 of any suitable type. As shown, one terminal of the rheostat 33 is connected, by means of a conductor 34, to the line conductor L2, and the other terminal is connected, by means of a conductor 35, to the field winding 32, which is, in turn, connected, by a conductor 36, to the field winding 31 from which the circuit is completed by a conductor 37 that leads to the line conductor L1.

When two dynamo-electric machines such as the armatures 11 and 12, are connected in parallel relation in this manner and are mounted on a common shaft to rotate at the same speed, it is clear that the speed-load characteristics of the two machines must be substantially identical if the load is to be equally divided between the two armatures. Inasmuch as direct-current machines of the shunt or the separately-excited type have relatively flat speed-load-characteristic curves, a slight discrepancy in the characteristics of the two armatures 11 and 12 may cause one armature to carry as much as twice the load of the other armature when the machines are operating at their normal speed.

In order to correct for such discrepancies in the characteristics of the armatures 11 and 12 as may be inherent in their construction or may arise from differences in temperature or other transient causes, a shunting rheostat 41 is provided for regulating the ratio of the currents flowing in the separately excited field windings 31 and 32. As shown in the drawings, one end of the resistance element of the rheostat 41 is connected, by a conductor 42, to the conductor 37, and the other end is connected, by means of a conductor 43, to the conductor 35. When so connected, the circuit may be traced through the rheostat 41 in shunt relation to the circuit through the field windings 31 and 32. From the line conductor L1, the circuit follows the conductor 37 and the conductor 42 to one end of the resistance element of the rheostat 41, through the resistance element, to conductors 43 and 35, through the rheostat 33, to conductor 34 and thence to the line conductor L2.

In order to vary the ratio of the currents flowing in the field windings 31 and 32, the rheostat 41 is provided with a movable contact member or arm 44 that is connected, by means of a conductor 45, to the conductor 36 between the field windings 31 and 32. A hand wheel 46 is provided for moving the contact member 44 to adjust the amount of resistance which is connected in parallel-circuit relation to each of the field windings 31 and 32. It may be readily seen that, with the contact members in the position shown in Fig. 1, a greater amount of resistance is connected in shunt relation to the field 31 than is connected in shunt relation to the field 32. Consequently, there will be less current shunted around the field 31 than around the field 32 or, in other words, the current flowing through the field 31 will be greater than the current flowing through the field 32.

If we consider the dynamo-electric machines 11 and 12, when operating as generators, with the clutch 6 engaged to connect the armature shaft 4 to the engine 8, it will be seen that, if the current in the armature 11 becomes greater than the current in the armature 12, it will be necessary to weaken the current flowing through the field 31 and strengthen the current flowing through the field 32 in order to equalize the armature currents. This balancing operation may be effected by rotating the hand wheel 46, in the clockwise direction, to so adjust the rheostat 41 that more current will be shunted around the field 31 and less current shunted around the field 32, as previously explained.

Inasmuch as it is desirable to effect the load-balancing operation automatically, a small motor 51 is provided for operating the rheostat 41, to which it may be connected by means of a clutch 52. Limit switches (not shown) may be provided on the rheostat 41 to stop the motor in case the movable contact member 44 is turned to the end of its travel in either direction, and means are provided for controlling the motor to cause it to move the contact arm 44, in response to an unbalanced condition in the armature circuit in the proper direction to correct the unbalance.

The means for controlling the motor 51 to effect automatic adjustment of the rheostat 41 comprises a polarized load-responsive relay 55 which is disposed to complete a circuit for energizing the motor 51 to operate it in the proper direction.

As shown, the motor 51 is connected in a circuit which may be traced from the line conductor L2, through a conductor 56, to a brush 57, through the armature of the motor 51, to a brush 58, thence by a conductor 59 to one of the series field windings 60 and 61. The field winding 60 is so wound that, when it is energized, the motor 51 will operate the rheostat 41 in the clockwise direction and it is connected, by means of a conductor 62, to a stationary contact member 63 on the relay 55. The field winding 61 is wound in such manner that, when it is energized, the motor 51 will turn the rheostat contact member 44 in the counter-clockwise direction and it is connected, by means of a conductor 64, to another stationary contact member 65 on the relay 55. The stationary contact members 63 and 65 are disposed to be engaged by a movable contact member 66 which is flexibly mounted at one end of a pivoted walking beam 67 that constitutes the movable element of the relay 55. From the walking beam 67, a conductor 68 leads to the line conductor L1, thus completing the circuit for the motor 51.

In order that the walking beam 67 may be actuated in response to an unbalance in the ratio of the currents flowing in the armatures 11 and 12, the relay 55 is provided with two electro-magnets 71 and 72 which are disposed to exert forces to rock the walking beam 67 in opposite directions, respectively, about a centrally disposed pivot 73 and which are connected to be energized in proportion to the currents flowing in the armatures 11 and 12, respectively. As shown, the energizing coil of the magnet 71 is connected in parallel relation to the interpole field winding 16 of the dynamo 11 and, inasmuch as the interpole winding 16 has a substantially constant resistance, the current flowing in the coil of the magnet 71 will be in direct proportion to the current flowing in the amature 11. This connection is effected by means of a conductor 74 that leads from the conductor 15, between the armature 11 and the interpole field 16, to the coil of the magnet 71, and a conductor 75 that leads from the magnet 71 to the conductor 17 between the interpole 16 and the line conductor L1. Similarly, the coil of the magnet 72 is connected in parallel relation to the interpole field winding 24 of the dynamo 12 by means of a conductor 76 and a conductor 77.

Considering the dynamos 11 and 12 as generators, it will be readily seen that if the current flowing in the armature 11 exceeds the current flowing in the armature 12, the magnet 71 will exert a larger force of attraction than will the magnet 72, and the walking beam 67 will be turned in the counter-clockwise direction about its pivot point 73. When the walking beam 67 is turned in a counter-clockwise direction, the movable contact member 66 engages the stationary contact member 63 and completes a circuit through the field winding 60 and the armature of the motor 51, thereby energizing the motor to turn the arm 44 of the rheostat 41 in the clockwise direction. This operation reduces the resistance of the shunt circuit around the field winding 31 of the dynamo 11, thereby reducing the amount of current which flows through the field 31 and simultaneously increasing the current which flows through the field 32 of the dynamo 12. Inasmuch as the currents flowing through the armatures 11 and 12 are proportional to the excitation furnished by the field windings 31 and 32, respectively, it is obvious that the current flowing in the armature 11 will be reduced, and the current flowing in the armature 12 will be increased in proportion to the changes effected in the currents flowing in the respective field windings. In this manner, a balanced relation between the currents flowing in the armatures 11 and 12 will be reestablished. After the armature currents have been balanced, the pulls of the magnets 71 and 72 will be equalized, and the walking beam 67 will be free to return to its central position under the influence of a centralizing spring mechanism 78.

It is necessary that the motor 51 shall operate the rheostat 41 slowly in order that a close permanent adjustment of the load relation between the armatures 11 and 12 may be effected. Further, it is desirable to perform the operation of permanently adjusting the load balance at a slow rate in order to avoid passing the balanced position and unbalancing the load ratio in the opposite direction which might result in an unstable or hunting action, whereby the load distribution would be unbalanced first in one direction and then in the other.

However, in operating two armatures in parallel in severe service, such as that encountered by submarine propulsion motors, an unbalanced condition of large magnitude may occur suddenly, and the overloaded armature may be damaged before the motor-operated rheostat can reestablish the balanced operating condition.

It is in order to prevent the damage which may be done by a sudden unbalance in the armature currents that the control system embodying the present invention has been developed. In this system, means are provided for momentarily and intermittently shunting the one or the other of the field windings 31 and 32 in order to maintain an approximately balanced condition of the armature currents during the time that the permanent adjustment is being effected by the motor-operated rheostat 41.

In order to effect the momentary shunting of the field windings, suitable relays 81 and 82 are provided for completing circuits in parallel relation to the field windings 31 and 32, respectively. As shown in the drawings, the shunting circuit for the field 31 may be traced from the conductor 37, through the conductor 42 and a conductor 83, to the contact members of the relay 81 and thence, by a conductor 84 and the conductor 45, to the conductor 36 at the other side of the field winding 31. Similarly, a shunting circuit may be traced around the field 32 from the conductor 36, through conductors 45 and 84, to the contact members of the relay 82 and thence, by a conductor 85 and the conductor 43, to the conductor 35.

When a large proportion of the load is suddenly imposed upon the armature 11, the magnet 71 of the relay 55 will be energized, as hereinbefore explained, to draw down the left end of the walking beam 67, thereby engaging the movable contact member 66 with the stationary contact member 63 to start the rheostat motor 51. As shown in the drawings, the movable contact member 66 is mounted upon a flexible element 86 in such manner that, after it engages the contact member 63, the walking beam 67 may continue to turn counter-clockwise for a short distance. The other end of the walking beam 67 is provided with a rigidly mounted movable contact member 87 for the purpose of completing the circuits for energizing the relay 81 or the relay 82 after the rheostat motor 51 has been energized. When the left end of the walking beam 67 is drawn down by the magnet 71 to its extreme position, the contact member 87 will engage a stationary contact member 88 to complete a circuit which may be traced from the line conductor L1, through the conductor 68, the walking beam 67, contact members 87 and 88 and a conductor 89, to the operating coil of the relay 81 and thence, by a conductor 91, to the line conductor L2.

When the coil of the relay 81 is thus energized, it will complete the shunting circuit around the field winding 31, as hereinbefore explained, and thus quickly and drastically reduce the amount of current flowing in the armature 11. This will cause the magnet 71 to be partially deenergized which will, in turn, permit the walking beam 67 to turn clockwise under the influence of the spring 78 and the flexible member 86. However, as soon as the contact members 87 and 88 have been separated, and before the walking beam 67 has turned far enough to separate the contact members 63 and 66, the relay 81 will be deenergized, and the shunt circuit around the field 31 will be opened. If the unbalanced condition has not yet been corrected by the motor-operated rheostat 41, the magnet 71 will again be energized which will bring the contacts 87 and 88 together again and reenergize the relay 81, thereby reestablishing the shunt circuit around the field 31.

This intermittent or fluttering action of the relay 81 will continue until the balanced condition has been permanently reestablished by the rheostat 41, as hereinbefore explained.

Likewise, if a large overload is suddenly imposed upon the armature 12, the magnet 72 of the relay 55 will be strengthened to draw down the right end of the walking beam 67, thereby completing the circuit through the contact members 65 and 66 to operate the rheostat 41 in the opposite or counter-clockwise direction and, subsequently, the contact member 87 will engage a stationary contact member 92 to energize the coil of the relay 82. This circuit may be traced from the line conductor L1, through the conductor 68, the walking beam 67, the contact members 87 and 92, and a conductor 93, to the operating coil of the relay 82 and thence, by the conductor 91, to the line conductor L2.

When the relay 82 is energized, it will complete the shunting circuit around the field winding 32, as hereinbefore explained, and will operate intermittently to correct the unbalanced condition temporarily, as described in connection with the relay 81, until the permanent adjustment has been made by the rheostat 41.

Inasmuch as the dynamo-electric machines 11 and 12 are to be used as motors, as well as generators, it is desirable that the load-balancing equipment be designed to automatically maintain the balanced relation between the armature currents when operating either as a generator or as a motor. In order to accomplish this end, the walking beam or movable element 67 of the relay 55 has been provided with armature coils 101 and 102 which cooperate with the magnets 71 and 72, respectively. The armature coils 101 and 102 are energized, at all times, from the storage battery 26 by means of a circuit which leads from the line conductor L1, through the conductor 68, a conductor 103, a resistance element 104, the coil 101, a conductor 105, the coil 102, a resistance element 106 and thence, by a conductor 107, to the line conductor L2.

It will readily be seen that, inasmuch as the current always flows in the same direction through the armature coils 101 and 102, if the direction of current flow in the magnets 71 and 72 is changed, the effect which they exert upon the walking beam 67 will also be changed. Thus, when the armatures 11 and 12 are acting as generators, the magnets 71 and 72 will attract the coils 101 and 102, and, as explained hereinbefore, the magnet which corresponds to the generator which is delivering the largest current will draw the walking beam down and establish a circuit for decreasing the current flowing in the field of the over-loaded generator. On the other hand, when the armatures 11 and 12 are acting as motors, the magnets 71 and 72 will repel the coils 101 and 102, and the magnet which corresponds to the motor that is taking the largest current will force the walking beam up and establish a circuit which will increase the current flowing in the field of the over-loaded motor.

Thus, inasmuch as the direction of current flow in the armatures and the direction in which the field current must be varied are both opposite, when the armatures are operated as motors, to the conditions existing when the armatures are operated as generators, it is clear that, inasmuch as the relay 55 is responsive to a change in direction of the armature current, it will make the field adjustment in the opposite direction and, consequently, the load-balancing system will function correctly when the armatures are operated as motors, as well as when they are operated as generators.

As a specific example, if we consider the dynamos 11 and 12 as motors, and that a suddenly imposed unbalanced condition causes the motor 11 to take a much larger current than the motor 12, it is clear that the magnet 71 of the relay 55 will exert a stronger force than will the magnet 72. Inasmuch as the magnets repel the armature coils on the walking beam 67, the magnet 71 will force the coil 101 upward and turn the walking beam in the clockwise direction.

This will cause the movable contact member 66 to engage the stationary contact member 65 to complete the circuit which energizes the motor 51 to operate the balancing rheostat 41 in the counter-clockwise direction. When turned in a counter-clockwise direction, the rheostat 41 introduces more resistance into the shunt circuit around the field 31, thereby causing more current to flow through the field winding which strengthens the field of the motor 11 and builds up the necessary counter-electromotive force to oppose the excessive currents flowing in the armature circuit. Simultaneously, the field 32 of the motor 12 is weakened to permit a larger proportion of the total current to flow through the armature 12.

After the contact member 66 engages the contact 65, the contact member 87 at the other end of the walking beam will engage the stationary contact member 92, thereby completing the circuit through the coil of the relay 82. When the relay 82 is energized, it completes a low-resistance shunt circuit around the field winding 32 which quickly reduces the counter-electromotive force in the armature 12 and permits the current in that armature to increase. As soon as the current in the armature 12 has increased to its normal value, the magnet 72 will exert an upward force on the coil 102 which will counter-balance the upper force exerted by the magnet 71 and permit the contacts 87 and 92 to separate. This will cause the relay 82 to drop out and, if a permanent adjustment has not yet been effected, the contact members 87 and 92 will be moved into engagement, and the relay 82 will close again.

This fluttering action will continue without disturbing the operation of the motor 51, until the balancing rheostat 41 has been adjusted to permanently reestablish the normal distribution of the load between the motors 11 and 12.

When operating as motors, the armatures 11 and 12 are subjected to severe conditions of unbalance and it is desirable that the temporary balancing operation be effected more rapidly than is necessary when they are operating as generators. This is accomplished by increasing the rate of vibration of the relay 55 and that of the relay 81 or the relay 82.

In order to quicken the rate of action or frequency of the relay 55 when the armatures 11 and 12 are operating as motors, circuits are provided for shunting the coil 101 or the coil 102 when the relay 82 or the relay 81 is energized, thereby weakening the force of repulsion which is exerted by the coil 71 or the coil 72 to turn the walking beam 67. Thus, when the contact members 87 and 92 are engaged, and the relay 82 is energized, an interlocking contact 112 on the relay 82 completes a shunt circuit around the coil 101 which may be traced from the conductor 103, through a conductor 113, to the interlocking contact 112 thence, through a variable-resistance element 114 and a conductor 115, to the conductor 105 at the other side of the coil 101. The frequency at which the relay 55 and the relay 82 will operate may be regulated by adjusting the value of the variable-resistance element 114. It will be readily seen that, if the resistance of the shunt circuit is decreased, the current flowing through the coil 101 will be correspondingly decreased when the contactor 112 is closed, and the speed with which the contact members 87 and 92 separate will be increased.

A similar shunt circuit around the armature coil 102 may be traced from the line conductor L2, through the conductor 91 and a conductor 117, to an interlocking contact 111 on the relay 81 and thence, through a variable-resistance element 118 and the conductor 115, to the conductor 105. In practice, it has been found that when the frequency of operation of the relay 55 has been adjusted by changing the resistance of the elements 118 and 114 in such manner that the balancing system operates satisfactorily when the machines are operating as motors, no further attention need be given this part of the apparatus. When operating as generators, the machines 11 and 12 are inherently quite stable.

The relay or regulator 55, which is shown in detail in Fig. 2 of the drawings, embodies the principles that are fully described and claimed in my copending application, Serial No. 221,422, filed September 23, 1927. As shown, the magnet coils 71 and 72 are mounted on cores of magnetic material 121 and 122 which are of sufficient length to extend into, and be surrounded by, the armature coils 101 and 102, respectively, on the walking beam 67. The cores 121 and 122 are mounted, respectively, on bracket members 131 and 132 of magnetic material which extend along the sides of the magnets 71 and 72 and are provided, at their upper ends, with annular portions 133 and 134, respectively, that completely surround the armature coils 101 and 102. As shown, the coils 101 and 102 are mounted upon metal sleeves 123 and 124 that depend from the respective ends of the walking beam 67 to position the coils within the annular air-gap between the upper ends of the cores 121 and 122 and the annular ends 133 and 134, respectively, of the bracket members 131 and 132. The pivot point 73 of the walking beam 67 is disposed in a substantially horizontal plane with the coils 101 and 102 in such manner that, when the beam is turned, the coils will move through the air-gaps in approximately vertical lines. The pivot point 73 may be a small shaft or bolt which is rigidly mounted on a suitable base 125, which also serves to support the bracket members 131 and 132 and the stationary contact members 63, 65, 88 and 92.

Although I have described a specific embodiment of my invention and illustrated it as it has been applied to a particular power-transmitting system, it will be apparent to those skilled in the art that the principles set forth in this specification may be applied to any power system in which it is desirable to balance the loads carried by a plurality of dynamo-electric machines, and that the balancing operation may be accomplished by apparatus other than the specific relays herein described without departing from the spirit and the scope of the invention, as defined in the appended claims.

I claim as my invention:

1. A control system for two mechanically connected shunt-wound motors that comprises a source of power for the motors, a regulating instrument responsive to an unbalance of the normal proportion in which power is taken by the two motors, a variable-resistance element for adjusting the amount of current supplied to the fields of each motor, means for operating the variable-resistance elements in response to movements of the regulating instrument, and means for momentarily shunting a portion of the variable-resistance element in response to said movements.

2. In a power system, in combination, two dynamo-electric machines, means for mechanically connecting the two machines, a source of power for operating the machines, a regulator responsive to an unbalance in the normal ratio of the electric currents flowing in the two machines, a corrective device responsive to the regulator for permanently adjusting the current ratio, and means responsive to the regulator for momentarily changing the current ratio to compensate for a sudden unbalance in the current flowing in the two machines.

3. In a power-transmission system, the combination with a plurality of mechanically connected electric motors, of means for operating the motors in parallel-circuit relation, said means comprising a motor-operated rheostat for regulating the relative strengths of the motor fields, a relay for operating the rheostat in response to the loads on the motors, and means responsive to the relay for momentarily shunting portions of the rheostat to regulate the motors for correction of sudden unbalanced conditions in the motor circuits.

4. A device for balancing the load of two motors connected in parallel circuit relation, in combination, a pair of motors, field windings for each motor, a rheostat for regulating the field currents of the two motors, a motor for driving the rheostat, means responsive to the load on each of the motors for controlling the rheostat motor, and means for momentarily shunting a portion of the rheostat in response to large unbalance between the loads of the two motors.

5. A control device for controlling a plurality of motors, a resistance unit, a plurality of motors, field windings for each motor, circuits for the motors to be controlled associated with said field winding, means for connecting portions of the resistance unit in said circuits, means for varying the proportions of the resistance unit in said circuits, and means for momentarily shunting portions of the resistance unit while the proportions thereof are being varied.

6. In a control system for a plurality of direct-current dynamo-electric machines having parallel-connected armature circuits and separately excited field circuits, a relay connected to all of the armature circuits and responsive to an unbalance in the current values therein, a motor operated rheostat in the field circuits, contactors responsive to the relay for operating the rheostat motor, other contactors responsive to the relay for shunting a portion of the rheostat momentarily, said second contactors having auxiliary contact members for changing the resistance in the relay circuit to cause the momentary shunting operation to occur intermittently and at a predetermined frequency.

7. In a power-transmission system, a plurality of direct-current dynamo-electric machines having the usual field and armature windings, said armature windings being connected electrically in parallel relation and connected mechanically to rotate in unison, said field windings being connected in series relation to each other and jointly in parallel relation to the armature windings, a resistance element connected in parallel relation to the field windings, a movable contact member disposed to engage the resistance element and connected to the field circuit at a point between two of the field windings for adjusting the currents in the field windings, a relay responsive to an unbalance in the currents flowing in the armature circuits for regulating the resistance element to restore a balanced condition, means responsive to the relay for moving the contact member to effect a permanent adjustment of the field currents, switches for shunting the resistace element from the contact member to each end thereof, and means responsive to the relay for closing one of the switches momentarily and intermittently to quickly counteract the unbalanced condition while the permanent adjustment is being effected.

8. In a power-transmission system, a plurality of direct-current dynamo-electric machines having the usual field and armature windings, said armature windings being connected electrically in parallel relation and connected mechanically to rotate in unison, said field windings being connected in series relation to each other and jointly in parallel relation to the armature windings, a resistance element connected in parallel relation to the field windings, a movable contact member disposed to engage the resistance element and connected to the field circuit at a point between two of the field windings for adjusting the currents in the field windings, a relay responsive to an unbalance in the currents flowing in the armature circuits for regulating the resistance element to restore a balanced condition, means responsive to the relay for moving the contact member to effect a permanent adjustment of the field currents, switches for shunting the resistance element from the contact member to each end thereof, means responsive to the relay for closing one of the switches momentarily and intermittently to quickly counteract the unbalanced condition while the permanent adjustment is being effected, an interlocking contact member associated with each of the switches, a resistance element disposed to be connected in shunt relation to the relay when the switch is closed for causing it to quickly open the switch, and means for adjusting the resistance element to change the frequency of operation of the switch.

9. In a power-transmission system, a plurality of direct-current dynamo-electric machines having the usual field and armature windings, said armature windings being connected eletrically in parallel relation and connected mechanically to rotate in unison, said field windings being connected in series relation to each other and jointly in parallel relation to the armature windings, a resistance element connected in parallel relation to the field windings, a movable contact member disposed to engage the resistance element and connected to the field circuit at a point between two of the field windings for adjusting the currents in the field windings, a relay having magnet coils each connected to the armature circuits in such manner that they are excited in proportion to the armature currents in each machine, and movable coils that are constantly excited from the line to which the armatures are connected, whereby the relay is responsive to an unbalanced condition of the currents in the armature circuits, means responsive to movements of the relay for moving the contact members on the resistance element to effect a permanent adjustment of the field currents to correct the unbalanced condition, switches for shunting portions of the resistance element, and means responsive to the relay for closing one of the switches to quickly change the field currents while the permanent adjustment is being effected.

10. In a power-transmission system, a plurality of direct-current dynamo-electric machines having the usual field and armature windings, said armature windings being connected electrically in parallel relation to the field windings, a resistance element connected in parallel relation to the field windings, a movable contact member disposed to engage the resistance element and connected to the field circuit at a point between two of the field windings for adjusting the currents in the field windings, a relay having magnet coils each connected to the armature circuits in such manner that they are excited in proportion to the armature currents in each machine, and movable coils that are constantly excited from the line to which the armatures are connected, whereby the relay is responsive to an unbalanced condition of the currents in the armature circuits, means responsive to movements of the relay for moving the contact members on the resistance element to effect a permanent adjustment of the field currents to correct the unbalanced condition, switches for shunting portions of the resistance element, means responsive to the relay for closing one of the switches to quickly change the field currents while the permanent adjustment is being effected, a resistance element in shunt relation to each of the movable coils, means associated with said switch for shunting one of the movable coils through the resistance element to cause the switch to open quickly, and means for adjusting the resistance element to change the frequency of operation of the switch.

11. In a control system for a plurality of direct-current dynamo-electric machines having parallel-connected armature circuits and separately excited field circuits, a relay connected to all of the armature circuits and responsive to an unbalance in the current values therein, a rheostat in the field circuits, a motor for operating the rheostat, said motor being controlled by said relay, contactors responsive to the relay for effecting intermittent shunting of sections of said rheostat and means for varying the electrical characteristics of said contactors to change the frequency of the intermittent shunting operation.

12. In an electrical control system for balancing the load of a plurality of parallel-connected motors, a plurality of motors, field windings for each of said motors, means for governing the excitation of said field windings comprising a variable resistor in circuit with said windings, means for gradually actuating said variable resistor, and means simultaneously operable for short-circuiting said resistor during predetermined conditions of unbalance of said motors.

In testimony whereof, I have hereunto subscribed my name this 21st day of May, 1930.

WALTER SCHAELCHLIN.